US011488201B1

(12) United States Patent
Aggarwal et al.

(10) Patent No.: US 11,488,201 B1
(45) Date of Patent: Nov. 1, 2022

(54) INBOX MANAGEMENT SYSTEM

(71) Applicant: Groupon, Inc., Chicago, IL (US)

(72) Inventors: Amit Aggarwal, Los Altos, CA (US);
David Thacker, Burlingame, CA (US);
Sean O'Brien, Fremont, CA (US)

(73) Assignee: GROUPON, INC., Chicago, IL (US)

( * ) Notice: Subject to any disclaimer, the term of this patent is extended or adjusted under 35 U.S.C. 154(b) by 0 days.

(21) Appl. No.: 17/027,176

(22) Filed: Sep. 21, 2020

Related U.S. Application Data

(63) Continuation of application No. 13/839,958, filed on Mar. 15, 2013, now abandoned.

(60) Provisional application No. 61/666,556, filed on Jun. 29, 2012.

(51) Int. Cl.
*G06Q 30/02* (2012.01)

(52) U.S. Cl.
CPC ................. *G06Q 30/0251* (2013.01)

(58) Field of Classification Search
CPC .................................................. G06Q 30/0251
USPC .................................................. 705/319, 14.9
See application file for complete search history.

(56) References Cited

U.S. PATENT DOCUMENTS

| | | | | |
|---|---|---|---|---|
| 4,212,231 A | * | 7/1980 | Penick | G09F 1/06 493/379 |
| 6,029,195 A | * | 2/2000 | Herz | H04N 21/25891 348/E7.071 |
| 6,336,099 B1 | | 1/2002 | Barnett et al. | |
| 6,415,262 B1 | * | 7/2002 | Walker | G06Q 30/0226 705/14.27 |
| 6,922,672 B1 | * | 7/2005 | Hailpern | G06Q 30/0255 705/14.66 |
| 7,251,617 B1 | * | 7/2007 | Walker | G06Q 20/20 705/16 |
| 7,809,601 B2 | | 10/2010 | Shaya et al. | |
| 7,899,866 B1 | * | 3/2011 | Buckingham | H04L 51/212 709/206 |
| 8,271,328 B1 | | 9/2012 | Baltz et al. | |
| 8,359,238 B1 | | 1/2013 | Kauchak et al. | |

(Continued)

FOREIGN PATENT DOCUMENTS

| | | |
|---|---|---|
| WO | 02/41209 A1 | 5/2002 |
| WO | 2014/004810 A2 | 1/2014 |

OTHER PUBLICATIONS

A Multimethod Approach to Evaluating Social Media Campaign Effectiveness (Year: 2013).*

(Continued)

*Primary Examiner* — Gautam Ubale
(74) *Attorney, Agent, or Firm* — Alston & Bird LLP

(57) ABSTRACT

Systems and methods are presented for managing electronic promotion correspondence sent to consumers. A system may manage electronic promotion correspondence sent on a per-consumer basis. The system may access multiple electronic promotion correspondences generated for a particular consumer, select an electronic promotion correspondence from among the multiple electronic promotion correspondences, and determine to send the electronic promotion correspondence to the consumer according to any number of factors. The system may determine a target time to send the first electronic promotion correspondence to the consumer and selected communication channel to send the electronic promotion correspondence through.

20 Claims, 9 Drawing Sheets

(56) References Cited

U.S. PATENT DOCUMENTS

| | | | |
|---|---|---|---|
| 8,583,484 B1* | 11/2013 | Chalawsky | H04N 21/23424 725/60 |
| 8,762,201 B1* | 6/2014 | Noonan | G06Q 30/0241 705/14.41 |
| 9,231,897 B1 | 1/2016 | Liden | |
| 10,535,076 B1* | 1/2020 | Thacker | G06Q 30/0251 |
| 11,080,754 B1* | 8/2021 | Han | G06Q 30/0201 |
| 2001/0032247 A1 | 10/2001 | Kanaya | |
| 2002/0007356 A1* | 1/2002 | Rice | G06N 5/04 706/47 |
| 2002/0032602 A1 | 3/2002 | Lanzillo et al. | |
| 2002/0161664 A1* | 10/2002 | Shaya | G06Q 30/0282 705/26.7 |
| 2002/0161779 A1 | 10/2002 | Brierley et al. | |
| 2003/0018780 A1 | 1/2003 | Kawashima | |
| 2003/0105664 A1* | 6/2003 | Van Luchene | G07C 15/005 705/14.13 |
| 2003/0208399 A1 | 11/2003 | Basak et al. | |
| 2004/0088363 A1* | 5/2004 | Doemling | H04L 69/329 709/207 |
| 2005/0228719 A1* | 10/2005 | Roberts | G06Q 30/0261 705/14.66 |
| 2006/0135233 A1 | 6/2006 | Willis et al. | |
| 2006/0136545 A1* | 6/2006 | Reistad | G06Q 30/0271 709/200 |
| 2007/0055565 A1* | 3/2007 | Baur | G06Q 10/02 705/14.69 |
| 2007/0055569 A1* | 3/2007 | Subramanian | G06Q 30/0277 705/14.42 |
| 2007/0061195 A1 | 3/2007 | Liu et al. | |
| 2007/0083433 A1 | 4/2007 | Lawe | |
| 2007/0112920 A1 | 5/2007 | Hay | |
| 2007/0150342 A1 | 6/2007 | Law et al. | |
| 2008/0015936 A1* | 1/2008 | Bibelnieks | G06Q 30/0277 705/14.43 |
| 2008/0015938 A1* | 1/2008 | Haddad | G06Q 30/0238 705/14.38 |
| 2008/0027787 A1* | 1/2008 | Malsbenden | G06Q 30/0631 705/7.29 |
| 2008/0103909 A1* | 5/2008 | Huang | G06Q 30/02 705/14.27 |
| 2008/0160956 A1* | 7/2008 | Jackson | H04W 4/029 455/406 |
| 2008/0202889 A1* | 8/2008 | Breitenbach | G07F 9/001 194/217 |
| 2008/0208787 A1* | 8/2008 | Luchene | G06Q 30/0224 706/47 |
| 2008/0262928 A1* | 10/2008 | Michaelis | G06Q 30/02 705/14.39 |
| 2009/0030798 A1 | 1/2009 | Otto et al. | |
| 2009/0047946 A1 | 2/2009 | Sato et al. | |
| 2009/0144201 A1 | 6/2009 | Gierkink et al. | |
| 2009/0164296 A1 | 6/2009 | Phan | |
| 2009/0216579 A1* | 8/2009 | Zen | G06Q 30/0207 705/14.1 |
| 2009/0265763 A1 | 10/2009 | Davies et al. | |
| 2010/0088157 A1* | 4/2010 | Wilson | G06Q 30/02 455/414.1 |
| 2010/0250359 A1* | 9/2010 | Gillenson | G06Q 30/0224 348/150 |
| 2010/0299209 A1* | 11/2010 | Mehta | G06Q 30/02 705/14.66 |
| 2010/0318407 A1* | 12/2010 | Leff | G06Q 30/0211 705/14.1 |
| 2010/0318418 A1* | 12/2010 | Wertheimer | G06Q 30/02 705/14.48 |
| 2011/0016161 A1 | 1/2011 | Loeb | |
| 2011/0055001 A1* | 3/2011 | Mattern | G06Q 30/0277 705/14.43 |
| 2011/0066692 A1 | 3/2011 | Ciancio-Bunch et al. | |
| 2011/0184937 A1 | 7/2011 | Jin | |
| 2011/0191176 A1* | 8/2011 | Merriman | G06Q 30/0257 705/14.49 |
| 2011/0208578 A1 | 8/2011 | Bergh et al. | |
| 2011/0208585 A1* | 8/2011 | Daboll | G06Q 10/00 709/224 |
| 2011/0225034 A1* | 9/2011 | Bayat | G06Q 30/0236 705/14.36 |
| 2011/0246297 A1 | 10/2011 | Buchalter et al. | |
| 2011/0288921 A1 | 11/2011 | King | |
| 2012/0022944 A1* | 1/2012 | Volpi | G06Q 30/0207 705/14.1 |
| 2012/0042025 A1* | 2/2012 | Jamison | G06Q 30/0242 709/206 |
| 2012/0054020 A1* | 3/2012 | Jacobs | G06Q 30/0269 705/14.42 |
| 2012/0054031 A9* | 3/2012 | Walker | G06Q 20/00 705/26.7 |
| 2012/0116840 A1* | 5/2012 | Omer | G06Q 30/02 705/14.1 |
| 2012/0130817 A1* | 5/2012 | Bousaleh | G06Q 30/02 705/14.58 |
| 2012/0143666 A1* | 6/2012 | Carrion | G06Q 30/02 705/14.23 |
| 2012/0191530 A1 | 7/2012 | Williams et al. | |
| 2012/0265597 A1* | 10/2012 | Saha | G06Q 30/02 705/14.66 |
| 2012/0265646 A1* | 10/2012 | Ghadialy | G06Q 30/0255 705/26.61 |
| 2012/0278172 A1* | 11/2012 | Mercuri | G06Q 30/02 705/14.58 |
| 2012/0290383 A1 | 11/2012 | Busch | |
| 2012/0330741 A1* | 12/2012 | Cruz | G06Q 30/0214 705/14.31 |
| 2013/0013545 A1 | 1/2013 | Agarwal et al. | |
| 2013/0024298 A1* | 1/2013 | Irvine | G06Q 30/0277 705/14.73 |
| 2013/0073381 A1* | 3/2013 | Binkley | G06Q 30/02 705/14.48 |
| 2013/0085804 A1* | 4/2013 | Leff | G06Q 30/0201 705/7.29 |
| 2013/0124299 A1* | 5/2013 | Montgomery | G06Q 30/0244 705/14.43 |
| 2013/0132365 A1* | 5/2013 | Chang | G06F 16/3344 707/794 |
| 2013/0159192 A1* | 6/2013 | Partridge | G06Q 30/02 705/14.1 |
| 2013/0173393 A1* | 7/2013 | Caiman | G06Q 30/0207 705/14.66 |
| 2013/0179264 A1* | 7/2013 | Wilson | G06Q 30/02 705/14.58 |
| 2013/0290141 A1* | 10/2013 | Bhaskar | G06Q 30/0603 705/26.61 |
| 2013/0290503 A1* | 10/2013 | Rajkumar | G06Q 30/0241 709/223 |
| 2014/0006129 A1* | 1/2014 | Heath | G06Q 30/02 705/14.23 |
| 2014/0006139 A1 | 1/2014 | Aggarwal et al. | |
| 2014/0095324 A1* | 4/2014 | Cabral | G06Q 30/08 705/14.71 |
| 2014/0120864 A1* | 5/2014 | Manolarakis | G06Q 30/0251 455/405 |
| 2014/0122238 A1* | 5/2014 | Lewis | G06Q 30/02 705/14.58 |

OTHER PUBLICATIONS

Targeted Advertising for the Communication Service Provider (Year: 2010).*

Periodic Email Prompts to Re-Use an Internet-Delivered Computer-Tailored Lifestyle Program: Influence of Prompt Content and Timing (Year: 2013).*

Anonymous, Advertisement System, Method and Computer Program Product, IP.com, Published Jul. 24, 2006.

Dow et al., A Location-based Mobile Advertisement Publishing System for vendors 2011 Eighth International Conference on Information Technology: New Generations, Feng Chia Univ., Taichung, Taiwan (downloaded May 11, 2021).

(56) References Cited

OTHER PUBLICATIONS

Jun et al., Design of Tag Match Advertising System and the evaluation of the business model, IEEE Asisa-Pacific Services Computing Conference, Feb. 2008.
Authors et al., "WI-OC-P Just-In-Time Promotion with Dynamic Adjustments Responsive to Customer Behavior", IP.com, dated (Mar. 6, 2009).
Byers et al., "Daily Deals Prediction, Social Diffusion, and Reputational Ramifications" dated (Sep. 7, 2011).
Drossos et al., "An Empirical Assessment of Factors that Influence the Effectiveness of SMS Advertising", Proceedings of the 40th Hawaii International Conference on System Sciences, dated (2007).
Anshin, Peter et al., "Developing an Index for Measuring the Engagement of Internet Media"; 2008 IEEE International Conference on Systems, Man and Cybernetics (SMC 2008); dated (2008); pp. 2182-2190.
Extended European Search Report from corresponding European Patent Application No. 13739541.4 dated Dec. 11, 2015.
International Search Report and Written Opinion for Application No. PCT/US2013/048154 dated Dec. 1, 2014.
Office Action for European Patent Application No. 13739541.4 dated Sep. 23, 2016, 7 pages.
PCT International Preliminary Reporton Patentability for application PCT/US2013/048154 issued Dec. 31, 2014.
RAPLEAF "The Consumer Data Marketplace" www.rapleaf.com/under-the-hood/ retrieved on May 7, 2013 (Year: 2013).
Supplementary European Search Report from corresponding European Patent Application No. 13739541.4 dated Jan. 8, 2016.
U.S. Application entitled "Sales Enhancement System", U.S. Appl. No. 13/460,745.
U.S. Patent Application filed Jan. 31, 2013, In re: Thacker entitled "entitled Pre-Feature Promotion System", U.S. Appl. No. 13/756,145.
U.S. Patent Application filed Mar. 15, 2013, In re: Aggarwal entitled "Cadence Management System for Consumer Promotions", U.S. Appl. No. 13/838,711.
U.S. Patent Application filed Mar. 15, 2013, In re: Li entitled "Promotion Offering System Analyzing Collection of Promotions", U.S. Appl. No. 13/838,415.
U.S. Patent Application filed Mar. 15, 2013, In re: Trimble entitled "Customization of Message Delivery Time Based on Consumer Behavior", U.S. Appl. No. 13/839,102.
U.S. Patent Application filed Mar. 2, 2012, In re: O'Brien entitled "Relevance System for Consumer Deals", U.S. Appl. No. 13/411,502.
U.S. Provisional Application entitled "Promotion Offering System Analyzing Collections of Promotions", U.S. Appl. No. 61/663,508.
U.S. Appl. No. 13/839,958, filed Mar. 15, 2013, Abandoned.

* cited by examiner

INBOX MANAGEMENT SYSTEM

REFERENCE TO RELATED APPLICATION

This application is a continuation of and claims priority to U.S. Nonprovisional application No. 13/839,958, titled "Inbox Management System," and filed Mar. 15, 2013, which claims the benefit of and priority to U.S. Provisional application No. 61/666,556, titled "Inbox Management," and filed Jun. 29, 2012, the entirety of which is hereby incorporated by reference herein.

TECHNICAL FIELD

The present description relates to offering promotions associated with a product or a service. This description also relates to managing electronic promotion correspondence sent to a consumer.

BACKGROUND

Merchants typically offer promotions to consumers from time to time in order to generate more business. The promotions offered may be in the form of discounts, deals, rewards or the like. Often times, a promotion, or a number of promotions, may be presented to a consumer in the form of an electronic correspondence. When a multitude of electronic correspondences are generated for a consumer, it may be difficult to determine which electronic correspondence to present to the consumer.

SUMMARY OF THE INVENTION

Systems and methods for determining whether to send electronic promotion correspondence to a consumer according to a target electronic correspondence cadence are disclosed.

In a first aspect, a system includes a memory storing processor-executable instructions and a processor in communication with the memory. The processor executes the processor-executable instructions to: access multiple electronic promotion correspondences generated for a consumer; select a first electronic promotion correspondence from among the multiple electronic promotion correspondences; determine to send the first electronic promotion correspondence to the consumer based on a target cadence indicator indicative of a target rate for sending electronic promotion correspondence to the consumer and an actual cadence indicator indicative of an actual rate that previous electronic promotion correspondence was sent to the consumer; determine a target time to send the first electronic promotion correspondence to the consumer; and send the first electronic promotion correspondence to the consumer at the target time.

In another aspect, a method includes: identifying a consumer to send an electronic promotion correspondence to; accessing a first electronic promotion correspondence that includes a first promotion of a first promotion class; accessing a second electronic promotion correspondence that includes a second promotion of a second promotion class different from the first promotion class; determining a selected electronic promotion correspondence to send to the consumer from among the first and second electronic promotion correspondence; and sending the selected electronic promotion correspondence to the consumer.

In yet another aspect, a method includes accessing multiple electronic promotion correspondences generated for a consumer, the multiple electronic promotion correspondences including a first electronic promotion correspondence of a first promotion class and a second electronic promotion correspondence of a second promotion class; determining that the first electronic promotion correspondence satisfies a first class-specific cadence criterion associated with the first promotion class; determining that the second electronic promotion correspondence satisfies a second class-specific cadence criterion associated with the second promotion class; determining a selected electronic promotion correspondence from among the first and second electronic promotion correspondences based on an additional management criterion; and sending the selected electronic promotion correspondence to a consumer.

Other systems, methods, and features will be, or will become apparent to one with skill in the art upon examination of the following figures and detailed description. It is intended that all such additional systems, methods, and features included within this description, be within the scope of the disclosure, and be protected by the following claims.

BRIEF DESCRIPTION OF THE DRAWINGS

The present invention may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

The present invention as described herein may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein.

Figure 1:
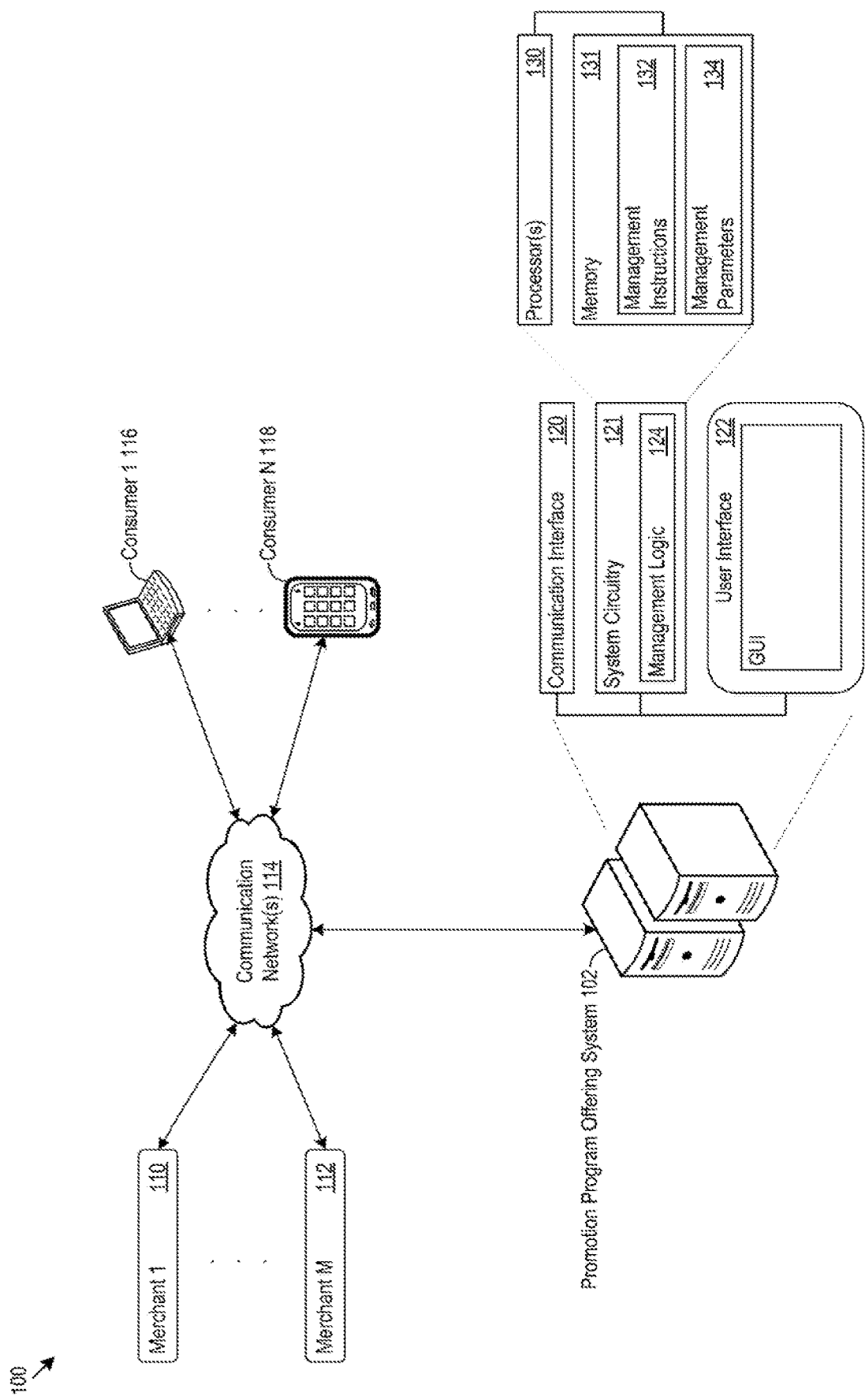
FIG. 1 shows an example of a system that manages electronic promotion correspondence sent to one or more consumers.

FIG. 1 shows an example of a system 100 that manages electronic promotion correspondence sent to one or more consumers. The system 100 includes a promotion program offering system 102. The promotion program offering system 102 sends promotions. A promotion may include any type of reward, discount, coupon, credit, deal, voucher or the like used toward part or all of the purchase of a product or a service. The promotion may be offered as part of a larger promotion program, or the promotion may be offered as a stand-alone one time promotion. In an effort to better distinguish and identify the promotion, the promotion may include one or more attributes, such as the merchant offering the promotion (e.g., the merchant identified as "XYZ coffee shop"), the redemption location of the promotion, the amount of the promotion, the category of the promotion (such as a restaurant promotion, a spa promotion, a travel promotion, a local promotion, etc.), the subcategory of the promotion (such as a sushi restaurant), or the like.

The promotion program offering system 102 may communicate with merchants to obtain promotions for offering, such as the merchants labeled as merchant 1 110 and merchant m 112 in FIG. 1. Also as shown in FIG. 1, the promotion program offering system 102 communicates via communication networks 114 with merchants. The promotion program offering system 102 may also send promotions to consumers, such as the consumers labeled as such as consumer 1 116 and consumer N 118 in FIG. 1, and more. The promotion program offering system 102 may send promotions to a consumer through any means or communication channel accessible by the consumer. For example, the promotion program offering system 102 may send electronic promotion correspondence directly to a consumer device, such as a laptop computer used by consumer 1 116, a mobile device used by consumer N 118, or any other electronic device that can receive or access electronic promotion correspondence. The promotion program offering system 102 may also send electronic promotion correspondence to an e-mail account of the consumer, when the consumer accesses a promotion website, or through any other information access point accessible by the consumer, e.g., which the consumer accesses via a consumer device. The electronic promotion correspondence may include one or more promotions.

The promotion program offering system 102 may include a communication interface 120, system circuitry 121, and a user interface 122. The system circuitry 121 may include management logic 124. As discussed in greater detail below, the management logic 124 may manage electronic promotion correspondence sent to consumers. In some implementations, the system circuitry 121 includes one or more processors 130 and a memory 131. The memory 131 may store management instructions 132 and management parameters 134. The processors 130 may execute the management instructions 132 to perform any of the processes or methods described herein. The management parameters 134 may specify any parameters, criteria, or other conditions used by the management logic 124 to manage electronic promotion correspondence sent to consumers.

Figure 2:
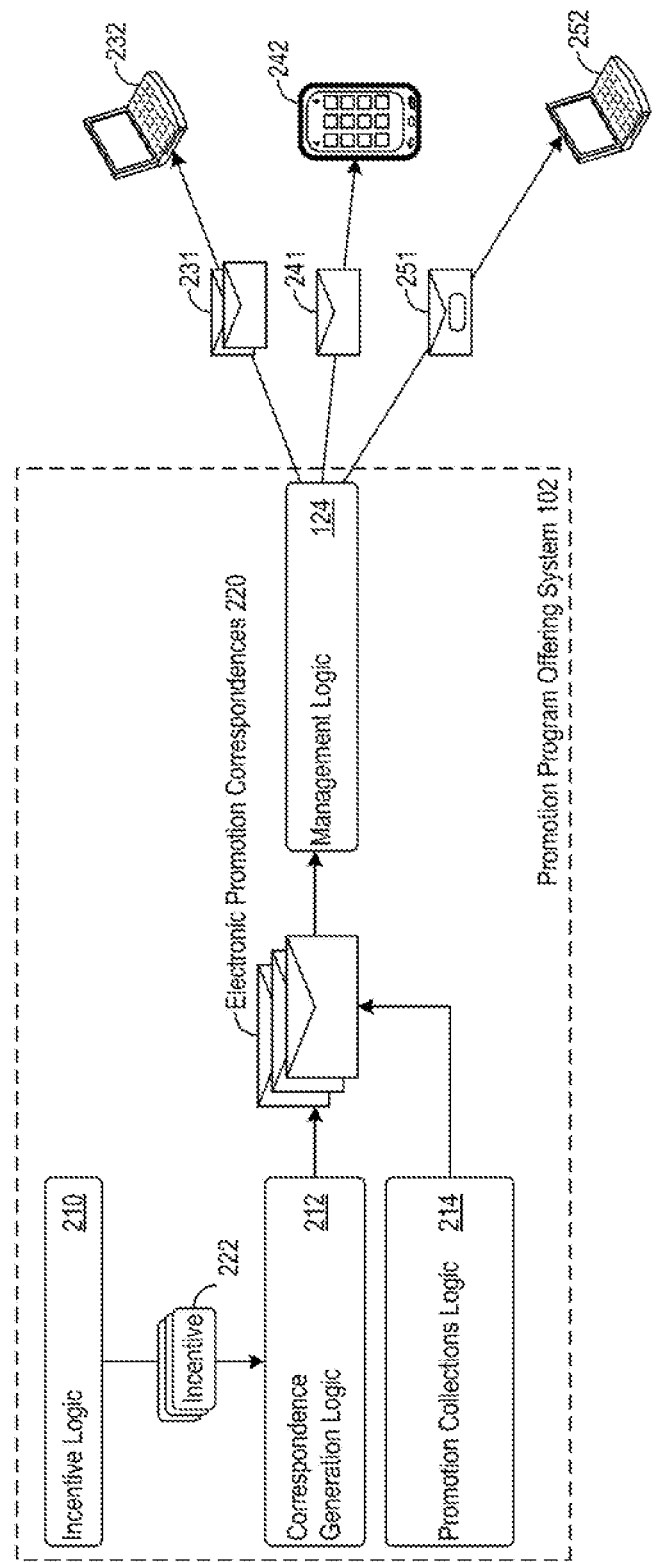
FIG. 2 shows an example of a system that manages electronic promotion correspondence sent to one or more consumers.

FIG. 2 shows an example of a system 200 that manages electronic promotion correspondence sent to one or more consumers. FIG. 2 provides one exemplary implementation of the promotion program offering system 102. In FIG. 2, the promotion program offering system 102 includes incentive logic 210, correspondence generation logic 212, promotion collections logic 214, and management logic 124.

In operation, the management logic 124 manages electronic promotion correspondence sent to consumers. In that regard, the management logic 124 may identify or access electronic promotion correspondences 220 generated for a particular consumer or consumer grouping and determine which (if any) of the electronic promotion correspondences 220 to send to the consumer, when to send the electronic promotion correspondence, through which communication channel to send the electronic promotion correspondence, and more. In one variation, the management logic 124 controls the sending of electronic promotion correspondence 220 on a consumer-specific level.

The management logic 124 may access and manage the sending of electronic promotion correspondences 220. The electronic promotion correspondences 220 may include any number of electronic promotion correspondence generated for a particular consumer. Put another way, the electronic promotion correspondences 220 may be specifically tuned for (or are particularly relevant to) a particular consumer, and account for past performance of promotions included in the electronic promotion correspondences 220, attributes of the consumer such as location, distance of a promotion from the consumer, gender, age, past purchase history, etc.

As part of the managing process, the management logic 124 may receive or access the electronic promotion correspondences 220 from any number of sources. In some variations, the management logic 124 receives electronic promotion correspondences 220 generated by other logic, circuitry, and/or components of the promotion program offering system 102. In the example shown in FIG. 2, the management logic 124 receives electronic promotion correspondences 220 from the correspondence generation logic 212 and the promotion collections logic 214.

The correspondence generation logic 212 may include any logic, component, or circuitry in the promotion program offering system 102 that determines which promotions to include in an electronic promotion correspondence. Examples of correspondence generation logic 212 are described in U.S. application Ser. No. 13/411,502, titled "Relevance System for Consumer Deals" and filed Mar. 2, 2012, hereby incorporated by reference herein in its entirety. The correspondence generation logic 212 may employ any of the methods, systems, and processes disclosed in U.S. application Ser. No. 13/411,502, e.g., to score and/or determine promotions to include in an electronic promotion correspondence, including promotions particularly relevant to a consumer.

The correspondence generation logic 212 may determine which promotions to include in an electronic promotion correspondence on a consumer-specific basis. For example, a promotion may be characterized by a promotion score, including any of the promotion scoring techniques described in U.S. application Ser. No. 13/411,502. The promotion generation logic 212 may generate a consumer-specific promotion score based on one or more attributes, historical data, or other characteristics of the consumer and/or the promotion. In one implementation, the promotion score of a promotion is a probability indicator of the particular consumer accepting (e.g., purchasing) the promotion. The correspondence generation logic 212 may select promotions to include in a generated electronic promotion correspondence with the highest individual, weighted, or collective scores. The management logic 124 may receive electronic promotion correspondences 220 and/or promotion scores generated by the correspondence generation logic 212.

The management logic 124 may additionally or alternatively receive electronic promotion correspondences 220 generated by the promotion collections logic 214. The promotion collections logic 214 may include any logic, component, or circuitry that generates electronic promotion correspondence including a collection of promotions. One example of promotion collections logic 214 is described in U.S. patent application Ser. No. 13/838,415, titled "Promotion Offering System Analyzing Collections of Promotions,", and filed on Mar. 15, 2013, hereby incorporated by reference herein in its entirety. The promotion collections logic 214 may, for example, determine a collection of promotions to include in an electronic promotion correspondence. In that regard, the promotion collections logic 214 may score one or more promotion collections and determine a promotion collection with the highest score to include in electronic promotion correspondence to the consumer. The promotion collections logic 214 may output electronic promotion correspondence(s) including a collection of promotions and/or scores for the promotion collection, promotions included in the promotion collection, or both. In some implementations, the promotion collections logic 214 is integrated within the correspondence generation logic 212. In other implementations, the promotion collections logic 214 is separate from and communicates with the correspondence generation logic 212.

The management logic 124 may receive generated electronic promotion correspondences 220 that include promotion incentives 222. A promotion incentive may refer to any adjustment or addition to a promotion (or multiple promotions) to affect how a consumer responds to the promotion. The incentive logic 210 may include any logic, component, or circuitry that determines a promotion incentive 222. The incentive logic 210 may determine a promotion incentive 222 that specifically targets a particular consumer (or group of consumers). For example, the incentive logic 210 may determine whether to offer a promotion incentive 222 and/or the contents of the promotion incentive 222 based on any number of consumer attributes or data, such as past purchase history of the consumer, time between purchases of a particular promotion, promotion category or promotion subcategory, promotion availability (e.g., inventory), and other factors. In one particular example, the incentive logic 210 may determine a promotion incentive 222 for a consumer that includes a reduced purchase price of a promotion when the amount of time since the consumer last purchased an identical promotion, a promotion of the same subcategory, or a promotion of the same category, exceeds a timing threshold. The incentive logic 210 may use any number of incentive criteria in determining whether to offer a promotion incentive 222 and/or the contents of the promotion incentive 222.

While some exemplary logic or circuitry through which the management logic 124 may receive electronic promotion correspondences 220 are presented above, any sources of electronic promotion correspondence are contemplated. The management logic 124 may receive the electronic promotion correspondences 220 as part of a promotion processing pipeline or data flow. Additionally or alternatively, the management logic 124 may access a memory of the promotion program offering system 102 to retrieve previously generated electronic promotion correspondences 220.

Upon accessing the electronic promotion correspondences 220, the management logic 124 may manage sending of none, some, or all of the electronic promotion correspondences 220 to a consumer. In that regard, the management logic 124 may control the schedule and/or content of electronic promotion correspondence sent to consumers. The management logic 124 may determine one or more electronic promotion correspondences to send to a particular consumer at predetermined frequency (e.g., performing the determination once every 24 hours, once every 12 hours, in response to an operator input, upon satisfaction of one or more determination criteria, or according to any other determination schedule parameters specified in the management parameters 134). In the example shown in FIG. 2, the management logic 124 determines to send multiple electronic promotion correspondences 231 to a first consumer, e.g., to an e-mail account of the consumer which the consumer accesses via consumer device 232. The management logic 124 determines to send a single electronic promotion correspondence 241 directly to the consumer device 242 of a second consumer, e.g., as a push notification and determines to send the incentivized electronic promotion correspondence 251 (e.g., including one or more promotion incentives 222) to an e-mail account of a third consumer, which the third consumer access via the consumer device 252. After determining to send the electronic promotion correspondences 232, 242, and 252 to respective consumers, the management logic 124 may also determine a target time to send each of the electronic promotion correspondences 231, 241, and 251 as well.

The management logic 124 may tune the sending of electronic promotion correspondence to a consumer according to any combination of management goals, which may be specified in the management parameters 134. For example, the management logic 124 may control the sending of electronic promotion correspondence to a consumer, grouping of consumers (e.g., grouped according to one or more common consumer attributes), or all consumers registered with the promotion program offering system 102 based on the management goals. Examples of management goals include increasing gross revenue (e.g., by X%), increasing consumer engagement and/or response to correspondence, increasing number of promotions purchased, increasing promotion profit margins, decreasing consumer unsubscription requests, any management goal that may be entered by an operator or administrator of the promotion program offering system 102 (e.g., via the user interface 122), or combinations thereof.

The management logic 124 may control the scheduling and content of electronic promotion correspondence sent to consumers in various ways and through various methods and techniques, in combination or separately. Several examples are presented next.

Personalized Cadence

The management logic 124 may control the cadence of electronic promotion correspondence sent to a consumer. Cadence may refer to a rate at which electronic promotion correspondence is sent to a consumer. Cadence may represent, for example, a desired, target, or actual rate. Cadence can be expressed in multiple ways or take any number of forms, several of which are described below. For example, electronic correspondence cadence for a consumer may be expressed as a frequency over a period of time (e.g., once every 3 days, twice a day, 3.1 correspondences sent per week, etc.) Cadence may be expressed as a numerical value indicative of the rate at which electronic promotion correspondence is sent to the consumer, for instance where increased cadence values indicate an increased frequency of electronic promotion correspondence sent to the consumer. Cadence may also be expressed as a frequency range or range of rates. The description below includes systems and methods for managing the cadence of electronic promotion correspondence sent to a consumer or set of consumers.

One example of systems, logic, and methods for controlling the cadence of electronic promotion correspondence sent to consumers is described in U.S. patent application Ser.

No. 13/838,711, titled "Cadence Management System For Consumer Promotions," and filed on Mar. 15, 2013, hereby incorporated by reference herein in its entirety. The management logic 124 may integrate any of the systems or logic or perform of the methods disclosed in the above-referenced application to control the cadence of electronic promotion correspondence on a per-consumer basis, including the cadence determination processing and determining of analysis scores for one or more electronic promotion correspondence. Put another way, the management logic 124 may access the electronic promotion correspondences 220 and determine a selected electronic promotion correspondence to send specifically for an individual consumer. In other variations, the management logic 124 may control the cadence of electronic promotion correspondence sent to groups of consumers, such as consumers sharing a common consumer attribute.

In one implementation, the management logic 124 applies a global threshold to determine whether to send the generated electronic promotion correspondences 220. The global threshold may correspond to an overall cadence for the consumer. The management logic 212 may apply any of the cadence management techniques described in U.S. patent application Ser. No. 13/838,711, titled "Cadence Management System For Consumer Promotions," and filed on Mar. 15, 2013. Thus, the management logic 124 may determine the score of one or more of the electronic promotion correspondences 220 and adjust the score to account for, as examples, a past engagement level of the consumer (e.g., specifically for a particular promotion category, subcategory, class, or other promotion categorization), number of past electronic promotion correspondences sent to the consumer over a particular time period, and other factors.

The management logic 124 may determine selected electronic promotion correspondence(s) as each of the correspondences among the generated electronic promotion correspondences 220 that, in one implementation, have a correspondence (e.g., analysis) score that exceeds the global threshold. In this implementation, the management logic 124 may score any of the generated electronic promotion correspondence 220 according to any of the factors or analyses described or incorporated by reference herein, including determining a correspondence score based on one or more promotion scores of included promotions and any supplemental analysis based on past engagement level, number of past correspondences sent to the consumer over a predetermined time period, and any analysis factors. The analysis factors may be applied based on overall data for the consumer or according to specific portions of the data, such as with respect to a particular attribute (e.g., promotion class, category, sub-category, etc.), for a predetermined time period, or according to any delineated portion.

The management logic 124 may apply additional management parameters (e.g., business rules) that may further limit the selected electronic promotion correspondences. For example, the business rules may specify a maximum number of electronic promotion correspondences to send to a consumer in a time period (e.g., per day). The management logic 124 may determine which of the selected correspondences to send based on the additional parameters, selecting a subset of the threshold-exceeding correspondences to send to the consumer. In some variations, and as described in greater detail below, the management logic 124 may merge two or more source correspondences into an aggregated electronic promotion correspondence that includes some or all of the promotions from the source correspondences.

The management logic 124 may additionally determine a target time to send a selected electronic promotion correspondence to the consumer. For example, the management logic 124 may determine a target time to increase the likelihood that the consumer will view the selected electronic promotion correspondence. In one variation, the management logic 124 may first determine a target time to send electronic promotion correspondence to a consumer, and subsequently determine a selected electronic promotion correspondence and/or selected communication channel based on the determined target time.

One example of systems, logic, and methods for determining a target time to send electronic promotion correspondence to a consumer is described in U.S. patent application Ser. No. 13/839,102, titled "Customization of Message Delivery Time Based on Consumer Behavior," and filed on Mar. 15, 2013, hereby incorporated by reference herein in its entirety. The management logic 124 may integrate any of the systems or logic or perform of the methods disclosed in the above-referenced application to determine a transmission time to send electronic promotion correspondence to a consumer.

As one example of personalized cadence, the management logic 124 may access generated electronic promotion correspondences 220 and determine, on a daily basis (e.g., at 24 hour intervals), one or more selected electronic promotion correspondences to send to particular a consumer based on a target cadence indicator of the particular consumer, an actual cadence indicator of the particular consumer, and respective analysis scores of the selected electronic promotion correspondences. The management logic 124 may then determine a transmission time during the day (e.g., during the next 24 hours before again performing the correspondence selection process) to send the selected electronic promotion correspondences to the particular consumer. The management logic 124 may perform such a correspondence selection process on a regular basis (e.g., every 24 hours, every 24 hours for a predetermined number of days during a week, etc.) or on an irregular basis (upon operator request or in response to certain situational criteria being met). The management logic 124 may implement personalized cadence according to any variation of parameters.

Content Optimization

The management logic 124 may determine one or more selected promotion correspondence from among the electronic promotion correspondences 220 to optimize promotion content sent to a particular consumer. In one implementation, the management logic 124 prioritizes the generated electronic promotion correspondence 220 to determine a selected electronic promotion correspondence to send to a consumer. For example, the management logic 124 may order one or more of the generated electronic promotion correspondences 220 according to criteria related to one or more promotion scores (e.g., sum of promotion scores for promotions included in an electronic promotion correspondence, max promotion score, weighted average, etc.) The management logic 124 may also normalize promotion scores in order to account for skew caused by comparison of promotions in different categories, types, sub-types, or promotion classes.

In some implementations, the management logic 124 groups the accessed electronic promotion correspondences 220 into one more groupings. Groupings may be determined based on one or more attributes associated with the accessed electronic promotion correspondence 220. As one continuing example, the management logic 124 may separate the electronic promotion correspondence 220 according to promotion class. A promotion class may refer to any configurable categorization of promotions set by the promotion program offering system 102. For example, the management logic 124 may specify promotions for products or goods as belonging to a first promotion class (e.g., "goods" promotions). As another example, the management logic 124 may specify time-sensitive promotions as belonging to particular promotion class (e.g., "deal-of-the-day" promotions) and travel-related promotions as belonging to a different promotion class (e.g., "getaway" promotions). Any number of additional or different classifications may be employed by the management logic 124.

The management logic 124 may optimize the content of electronic promotion correspondence sent to a consumer by prioritizing between electronic promotion correspondences of different promotion classes. While the description with respect to FIGS. 3-5 below focuses on promotion groupings based on promotion class, the management logic 124 may, in a consistent matter, perform the methods and techniques below for promotions grouped according to any additional or alternative grouping criteria instead, e.g., as specified through the management parameters 134.

Figure 3:
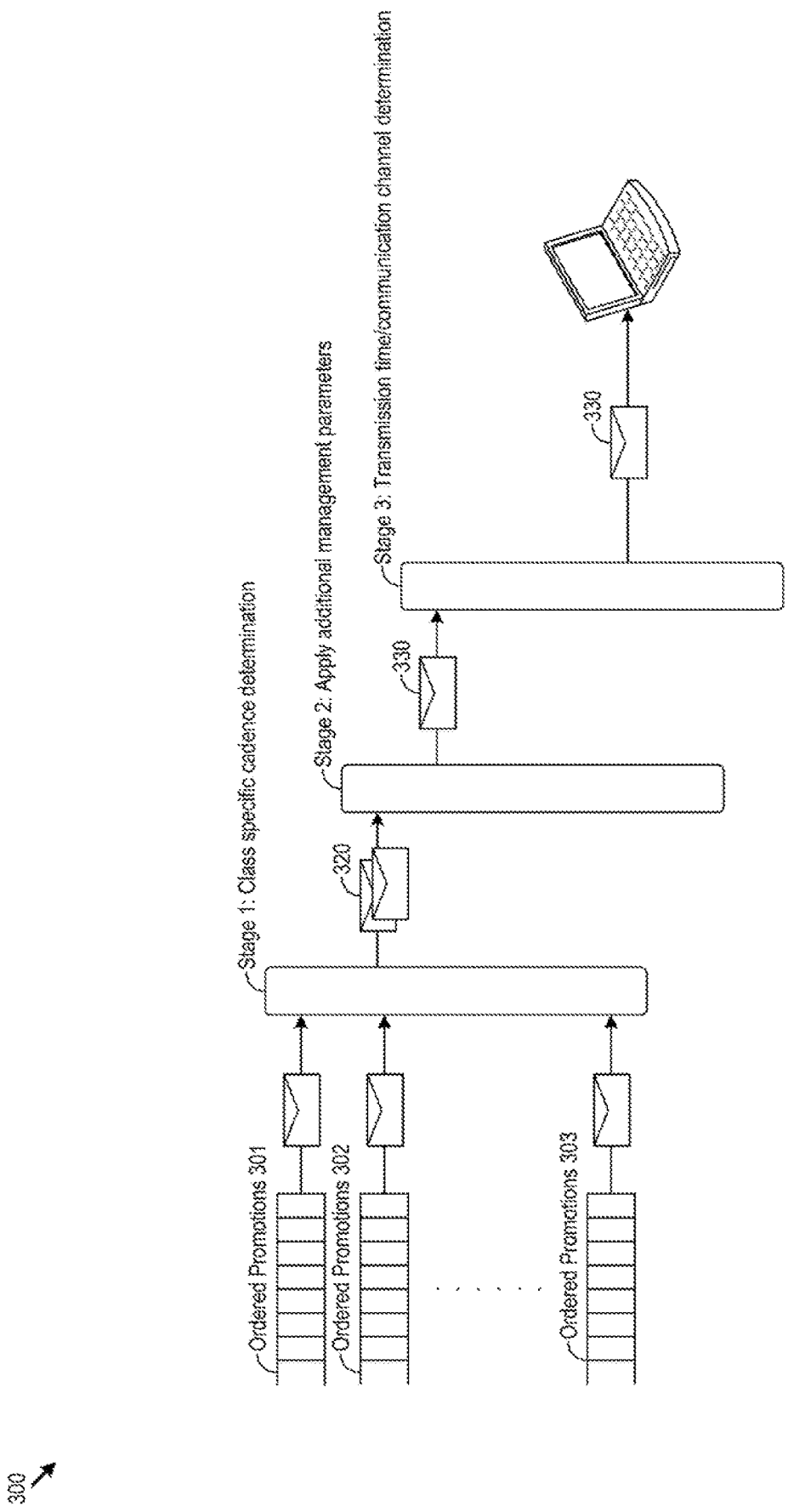
FIG. 3 shows an example of a data flow for determining electronic promotion correspondence to send to a consumer.

FIG. 3 shows an example of a data flow 300 for determining electronic promotion correspondence to send to a consumer based on promotion classes. The management logic 124 accesses generated electronic promotion correspondences 220 and groups the electronic promotion correspondences 220 according to promotion class. The management logic 124 may also order each group of promotions, according to a promotion or analysis score associated with each electronic promotion correspondence. In the example shown in FIG. 3, the management logic 124 determines ordering for electronic promotion correspondences of multiple promotion classes, including the ordered promotions 301 for electronic promotion correspondences of a first promotion class, the ordered promotions 302 for electronic promotion correspondences of a second promotion class, and the ordered promotions 303 for electronic promotion correspondences of an $n^{th}$ promotion class. In one example, the management logic 124 orders a promotion ordering (e.g., 301-303) such that the electronic promotion correspondence at the head of the ordering is the correspondence of the promotion class with a highest associated score (e.g., any of the promotion scoring, correspondence scoring, collections scoring, analysis scoring, etc.).

At stage 1 of the exemplary data flow 300, the management logic 124 may access an electronic promotion correspondence with the highest score (e.g., for each promotion class) and perform a class-specific cadence determination. In that regard, the management logic 124 may maintain a respective, separate cadence on a promotion class specific basis. The management logic 124 may maintain a target cadence for electronic promotion correspondence of a particular promotion class sent to the consumer, as well as track the actual cadence of the for electronic promotion correspondence of a particular promotion class sent to the consumer (e.g., over a predetermined time period). The management logic 124 may tune sending of electronic promotion correspondences according to the respective target and actual cadences for electronic promotion correspondences of each promotion class, including in any of the ways described in U.S. patent application Ser. No. 13/838,711, titled "Cadence Management System For Consumer Promotions," and filed on Mar. 15, 2013.

The management logic 124 may determine the affinity of consumer to particular correspondences, such as electronic promotion correspondences of a particular promotion class.

The management logic 124 may adjust the scoring of electronic promotion correspondences of a particular promotion class based on a user engagement level for previously sent electronic promotion correspondences of the particular promotion class. The engagement level of the consumer may refer to any response data indicating the degree or level to which the consumer accessed previously sent electronic promotion correspondence. The management logic 124 may determine, as examples, a number of previously sent electronic promotion correspondence accessed by the consumer (e.g., e-mails opened), a number of previously presented promotions accessed by the consumer (e.g., webpages of promotions accessed), a number of previously presented promotions purchased by the consumer, a total, average, or maximum value of promotions purchased by the consumer, and more. The analytical model 104 may use the past engagement level data or measure the past engagement level of the user for a predetermined or configurable time period, e.g., the last two weeks, the last 6 months, time in which a particular number of electronic promotion correspondences were sent to the consumer, etc.

As one example, Chart 1 below shows cadence data of different promotion classes for a particular consumer as determined over a time period of one week:

TABLE 1

| | Promotion Class 1 | Promotion Class 2 | Promotion Class 3 | Promotion Class 4 |
| --- | --- | --- | --- | --- |
| Actual Cadence | 6/7 | 1/7 | 1/7 | 4/7 |
| Target Cadence | 7/7 | 3/7 | 1/7 | 4/7 |
| Score Adjustment | 1.0 | 1.1 | 0.1 | 0.8 |
| Score | 0.8 | 0.6 | 0.8 | 0.7 |
| Final Score | 0.8 | 0.66 | 0.08 | 0.56 |

The management logic 124 may determine the cadence adjustment based on the past engagement level of the consumer, which may not necessarily be a linear increase or decrease with respect to past engagement level for a predetermined time period. The score may refer to a promotion score or analysis score associated with a particular electronic promotion correspondence and the final score may account for the cadence adjustment factor (e.g., by multiplying with the promotion or analysis score of an electronic promotion correspondence). In this way, the management logic 124 may account for the consumer's affinity (e.g., engagement or response level) to correspondences of the promotion class. The management logic 124 may maintain a threshold value that the score of an electronic promotion correspondence must, for example, exceed before the management logic 124 determines to send the electronic promotion correspondence.

Returning to stage 1 of the exemplary data flow 300, the management logic 124 may perform class specific cadence determination of whether to send the highest scoring electronic promotion correspondence of one or more promotion classes (e.g., for each promotion class). In that regard, the management logic 124 may determine which of the highest scoring electronic promotion correspondences for each promotion class satisfies its class-specific cadence. At the completion of stage 1, the management logic 124 may determine one or more electronic promotion correspondences 320 that are eligible for sending according to promotion class-specific cadence, which may be input into stage 2.

At stage 2 of the exemplary data flow 300, the management logic 124 may apply additional management parameters. For example, the additional management parameters may specify a maximum number of electronic promotion correspondence to send to a consumer over a time period (e.g., per day). The management logic 124 may select one or more of the multiple electronic promotion correspondences 320 meeting their respective promotion class specific cadence requirements, in accordance with the additional management parameters, e.g. a number of top scoring correspondences based on normalized correspondence scoring. In FIG. 3, the additional management parameters specify a maximum of one electronic promotion correspondence to send to the consumer in a day, and the management logic 124 determines a selected electronic promotion correspondence 330.

In some variations, the additional management parameters may specify complying with a target total or overall cadence for a particular consumer, which may be separate from or in addition to the respective target promotion class-specific cadences maintained by the management logic 124. In this case, at stage 2, the management logic 124 may perform additional cadence analysis to determine, for example, the maximum number or which of the input electronic promotion correspondences 320 to send to the consumer. Any number of additional management parameters may be applied at stage 2. In one implementation, the management logic 124 does not apply any additional management parameters and determines each of the electronic promotion correspondences 320 meeting their respective promotion class specific cadence requirements as selected electronic promotion correspondences to send to the consumer.

At stage 3 of the exemplary data flow 300, the management logic 124 determines a transmission time to send the selected electronic promotion correspondence 330 to the consumer. The management logic 124 may also determine a communication channel to send the selected electronic promotion correspondence 330 as well.

Figure 4:
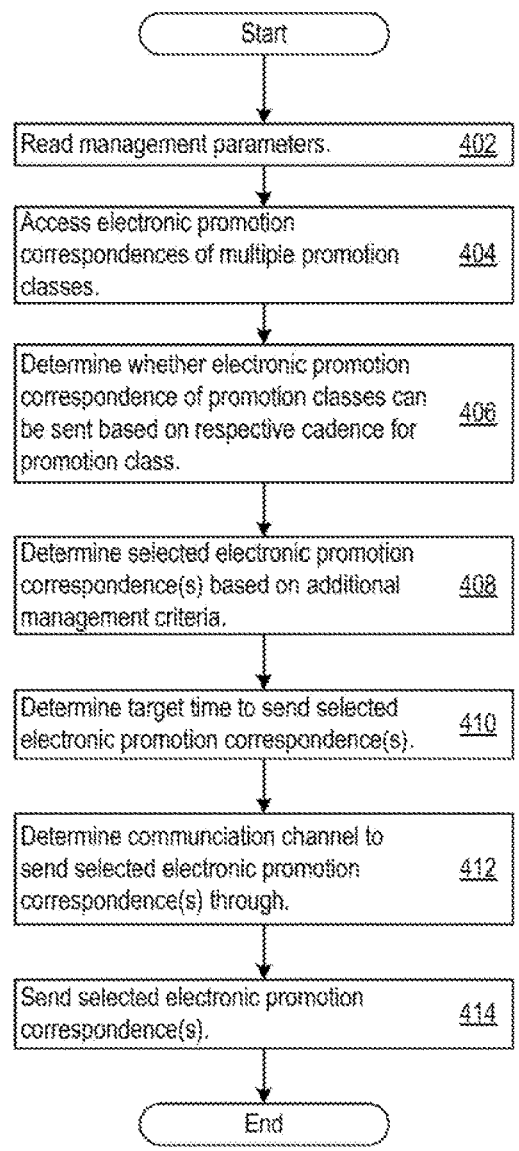
FIG. 4 shows an example of logic for determining one or more selected electronic promotion correspondences to send to a consumer.

FIG. 4 shows an example of logic 400 for determining one or more selected electronic promotion correspondences to send to a consumer. The logic 400 may be implemented in hardware, software, or a combination of both. As one example, the management logic 124 may implement the logic 400 in software as management instructions 132.

The management logic 124 reads the management parameters 134 (402) and electronic promotion correspondences of multiple promotion classes (404). As described above, the management logic 124 may receive generated electronic promotion correspondences 220 from other logic or components of the promotion program offering system 102 or access generated electronic promotion correspondences 220 from a memory.

The management logic 124 may determine whether the generated electronic promotion correspondences 220 can be sent based on a respective cadence for a promotion class that one or more respective generated electronic promotion correspondences 220 belong to (406). In one example, the management logic 124 performs the class-specific cadence determination for each of the generated electronic promotion correspondences 220. In another example, the management logic 124 may group the generated electronic promotion correspondences 220 according to promotion class, order each grouping, and access an electronic promotion correspondence from each ordering (e.g., the head) to perform a class-specific cadence determination on. In doing so, the management logic 124 may, for each promotion class, identify a target cadence, actual cadence, and assess the strength of electronic promotion correspondence (e.g., according to an analysis score) to determine correspondences among the generated electronic promotion correspondences 220 that satisfy cadence criteria and are thus eligible for sending to the consumer.

The management logic 124 may determine one or more selected electronic promotion correspondences based on additional management criteria (408), such as any of the additional management parameters described above. In that regard, the management logic 124 may determine one or more selected electronic promotion correspondences from among the respective electronic promotion correspondences of each promotion class that satisfy class-specific cadence criteria. The management logic 124 may optionally determine a target transmission time to send the selected electronic promotion correspondences (410) and/or a communication channel to send the selected electronic promotion correspondences through (412). The management logic 124 sends the selected electronic promotion correspondences (414) to the consumer.

In one particular scenario, the management logic 124 may determine that none of the generated electronic promotion correspondences 220 meet their class-specific cadence criteria and are not eligible for sending to the consumer. In some implementations, the management logic 124 may determine to forego sending any electronic promotion correspondence to the consumer. In other implementations, the management logic 124 may aggregate one or more of the generated electronic promotion correspondences 220 or one or more promotions of the generated electronic promotion correspondences 220 into an aggregated correspondence. The aggregated correspondence may be generated by the management logic 124 to include, e.g., the top 3 (or other configurable number of) scoring promotions retrieved from the generated electronic promotion correspondences 220, including promotions across different promotion classes. The management logic 124 may combine one or more of the generated electronic promotion correspondences 220 into the aggregated correspondence, including correspondences across different promotion classes. In that way, the aggregated correspondence may include promotions from multiple promotion classes, and the management logic 124 may determine the aggregated correspondence as the selected electronic promotion correspondence.

The management logic 124 may produce an aggregated electronic promotion correspondence in multiple scenarios. For example, the management logic 124 may access feedback or experimental data indicating that the probability of a particular user or group of users accepting a promotion of group of promotions increases when certain promotion classes are combined into an aggregated electronic promotion correspondence. In other implementations, the management logic 124 may analyze one or more potential aggregated electronic promotion correspondences and determine whether the analysis score for the potential aggregated electronic promotion correspondences including promotions of multiple promotion classes exceeds the analysis score of non-aggregated electronic promotion correspondences with promotions of a single promotion class.

The management logic 124 may perform the steps described in the logic 400 (or any other logic described herein) at predetermined times or in response to a performance condition. For example, the management logic 124 may perform the logic 400 once per day, once every 12 hours, in response to identifying the availability of a generated electronic promotion correspondence for the consumer, in response to receiving a generated electronic promotion correspondence 220 for the consumer, after a predetermined amount of time has elapsed since sending a previous electronic promotion correspondence (which may vary according to the target cadence indicator of the consumer), in response to receiving an indication that the consumer is in a predetermined location, and more.

Figure 5:
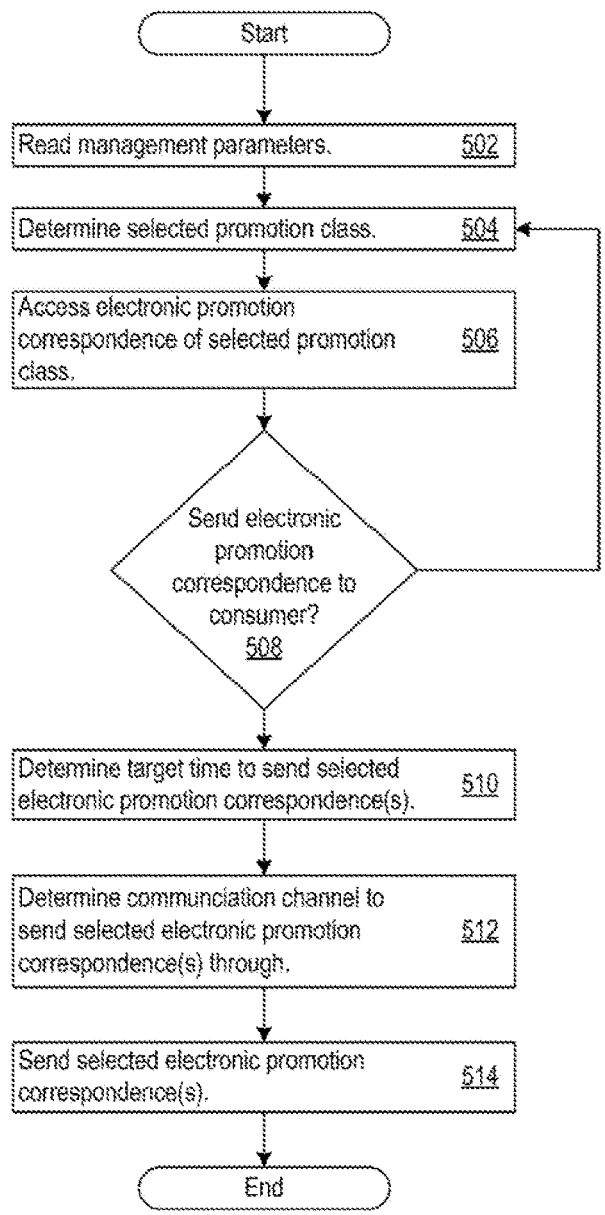
FIG. 5 shows an example of logic for determining one or more selected electronic promotion correspondences to send to a consumer.

FIG. 5 shows an example of logic for determining one or more selected electronic promotion correspondence to send to a consumer. The logic 500 may be implemented in hardware, software, or a combination of both. As one example, the management logic 124 may implement the logic 500 in software as management instructions 132. The logic 500 presents an additional or alternative variance for determine selected electronic promotion correspondence to send to a consumer.

The management logic 124 reads the management parameters 134 (402) and determines a selected promotion class (504). The management logic 124 may determine a selected promotion class according to any number of criteria or parameters. The management logic 124 may determine the selected promotion class according to the class-specific cadence of one or more promotion classes, including the target and actual cadence of the one or more promotion classes. For instance, the management logic 124 may calculate a difference between the target cadence and actual cadence for each promotion class over a predetermined period of time, e.g., for the past week. When the actual cadence of one or more promotion classes is less than the respective target cadence, the management logic 124 may determine the specific promotion class with the greatest difference as the selected promotion class (e.g., the promotion class whose actual cadence is the furthest below its respective target cadence). When the actual cadence of each promotion class is greater than its respective target cadence, the management logic 124 may determine the specific promotion class with the least difference as the selected promotion class (e.g., the promotion class whose actual cadence is the least above its respective target cadence). In some variations, the management logic 124 may forego determining a selected promotion class, such as when the actual cadence of each promotion class is greater than its respective target cadence and each actual-target cadence difference exceeds a particular difference threshold.

After determining a selected promotion class, the management logic 124 may access generated electronic promotion correspondence(s) 220 of the selected promotion class (506). Then, the management logic 124 determine whether to send the electronic promotion correspondence(s) to the consumer (508), based on a class-specific cadence and according to any of the cadence determination processes described above or incorporated herein. When the management logic 124 determines not to send the electronic promotion correspondence, the management logic 124 may select another promotion class, e.g., according to the processes described above while filtering the previously selected promotion class from the selection process, access electronic promotion correspondence and determine whether to send the electronic promotion correspondence (506-510). The management logic 124 may continue these class-selection and correspondence-sending determination processes until the management logic 124 identifies an electronic promotion correspondence that meets respective class-specific cadence criteria or until any number of ending criteria are met (e.g., upon analysis of a determined number of correspondences, when each of the generated electronic promotion correspondences 220 have been analyzed, after an amount of analysis time has elapsed, or according to any other criteria).

Upon determining a selected electronic promotion correspondence to send to the consumer, the management logic 124 may optionally determine a target transmission time (510) or a communication channel to send the selected electronic promotion correspondence through (512). The management logic 124 sends the selected electronic promotion correspondence to the consumer.

The discussion above provides exemplary content optimization methods for controlling content of electronic promotion correspondence that is sent to a consumer. Any number of additional or alternative content optimization methods are contemplated.

Strategy-Level Experimentation

The management logic 124 may apply any number of strategy-level experiments for electronic promotion correspondence sent to consumers. The management logic 124 may gather feedback data from experiments and tune the scheduling and content of electronic promotion correspondence sent to one or more consumers based on the obtained feedback data. For instance, the management logic 124 may build consumer or correspondence models to predict how a particular consumer will respond to a particular correspondence by examining how similar consumers (e.g., consumers sharing one or more common consumer attributes) responded to identical or similar correspondences sharing one or more similarity attributes (e.g., promotion attributes, promotion class, or other attributes of the correspondence).

Figure 6:
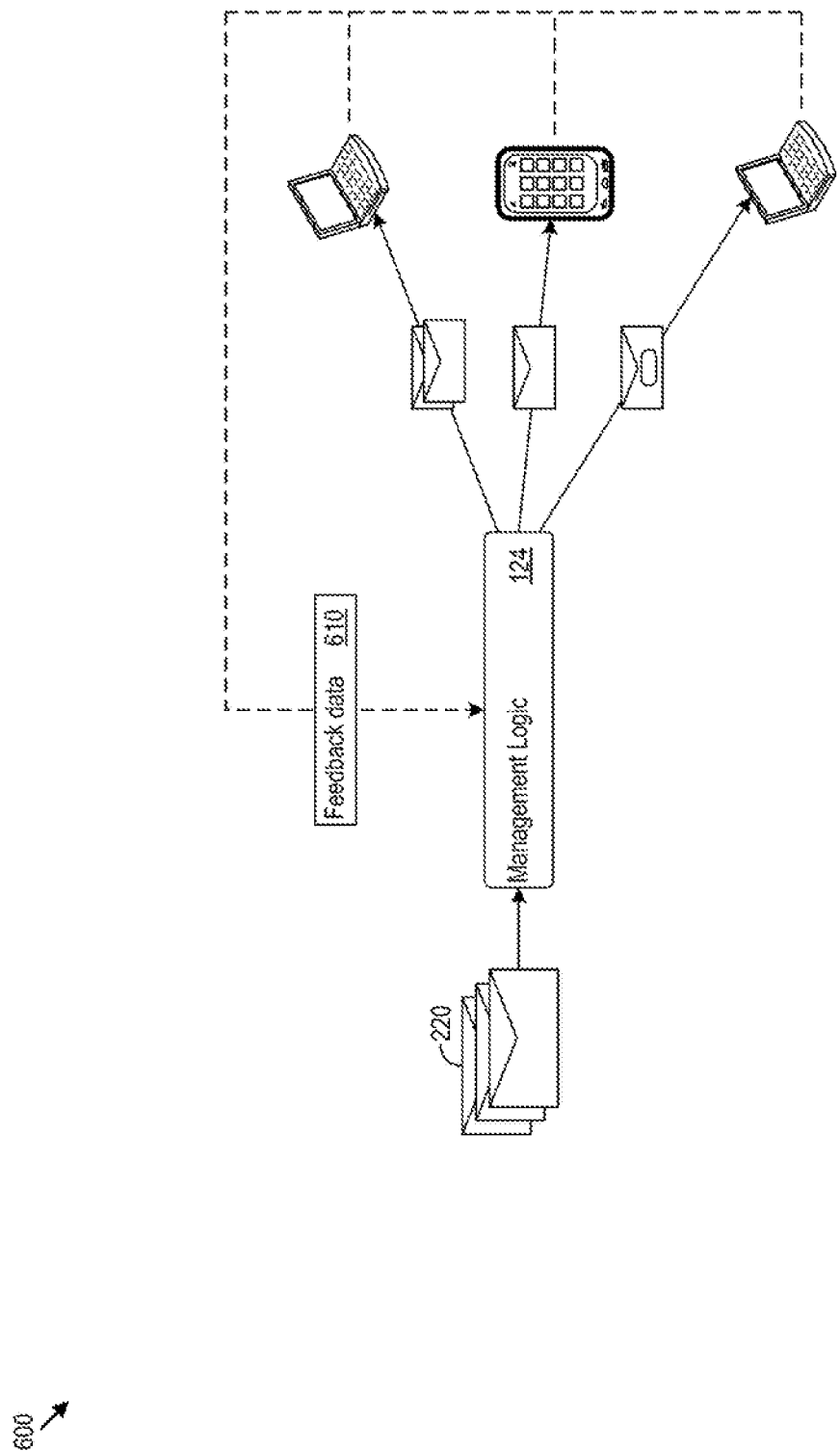
FIG. 6 shows an example of a system for determining electronic promotion correspondence to send to one or more consumers based on feedback data.

FIG. 6 shows an example of a system 600 for determining electronic promotion correspondence to send to one or more consumers based on feedback data 610. The management logic 124 may send electronic promotion correspondences to consumers and collect associated feedback data 610. The feedback data 610 may include any indicators of engagement level of a consumer in response to the sent electronic promotion correspondence, including a number of previously sent electronic promotion correspondence accessed by the consumer (e.g., e-mails opened), a number of previously presented promotions accessed by the consumer (e.g., webpages of promotions accessed), a number of previously presented promotions purchased by the consumer, a total, average, or maximum value of promotions purchased by the consumer, and more. In response to receiving feedback data 610 from a particular consumer, the management logic 124 may, for example, adjust the target cadence (e.g., promotion class-specific, total, or both) of electronic promotion correspondences sent to the particular consumer that the feedback data 610 originated from.

The management logic 124 may also adjust the target cadence of electronic promotion correspondences sent to other consumers in response to the feedback data 610 as well. For example, the management logic 124 may use the feedback data 610 originating from a first consumer to predict a response of another consumer sharing one or more common consumer attributes with the first consumer (e.g., age range, location, preferences, engagement level, etc.).

Figure 7:
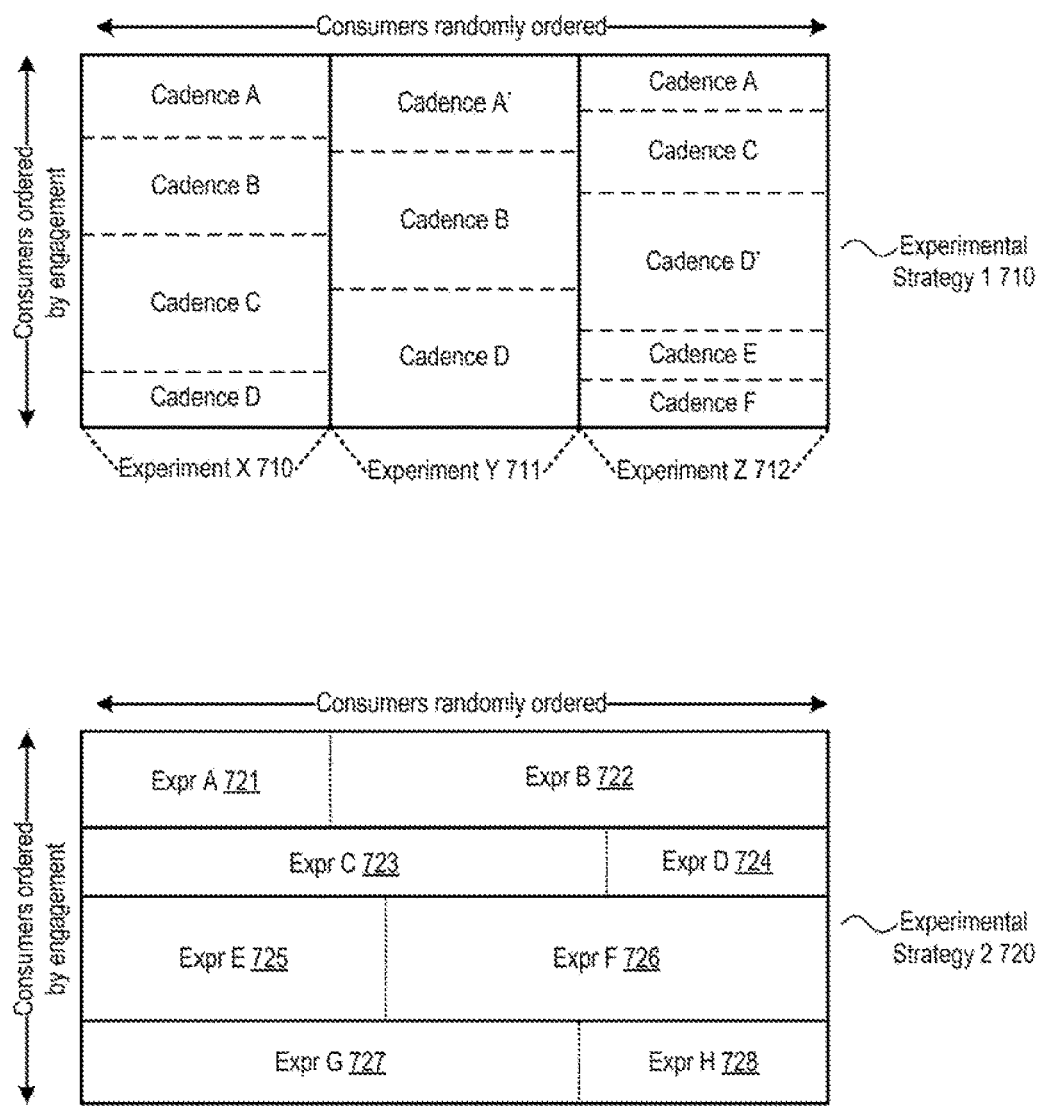
FIG. 7 shows examples of experimental strategies that the management logic may perform.

The management logic 124 may also perform experiments to gather feedback data 610 and more effectively tune electronic promotion correspondence sent to consumers. In that regard, the management logic 124 may segment one or more consumer groups and perform experiment(s) on a segmented portion of consumers. The management logic 124 may employ one or more experimental strategies to obtain feedback data 610. FIG. 7 shows examples of experimental strategies that the management logic 124 may perform, including the strategies labeled experimental strategy 1 710 and experimental strategy 2 720.

The management logic 124 may determine a consumer base to perform the one or more experiments. The consumer base may include a sub-set of the total consumers the promotion program offering system 102 sends correspondence to. For example, the consumer base may be a representative distribution of the total consumer base available to the promotion program offering system 102. The consumer base may be randomly selected, or selected according to any number of selection criteria, e.g., according to one or more consumer attributes, past engagement level, or any other criteria. The management logic 124 may determine a consumer base of any size (e.g., 1000 consumers, or 10% of the total consumer base),.

In employing an experimental strategy, the management logic 124 may divide or apportion consumers (e.g., of a consumer base) into different consumer segments. In the first experimental strategy, the management logic 124 may segment consumers based on an engagement level of the consumer as seen as the y-axis of the experimental strategy 1 710 (e.g., based on total engagement level, for a particular promotion class, for a particular time of the year, for a particular promotion category or subcategory, or according to any other engagement segmentation criteria). The management logic 124 may divide consumers according to any alternative or additional segmentation attributes. In the example shown in FIG. 7, the management logic 104 arranges consumers in a random order on the x-axis of the experimental strategy 1 710, thus providing a random distribution of the consumers of a common engagement level.

The management logic 124 may apply multiple experiments according to the consumer segmentation depicted in experimental strategy 1 710, including the experiments labeled as experiment X 710, experiment Y 711, and experiment Z 712. For each experiment, the management logic 124 may vary an experimental control factor. In FIG. 7, the management logic 710 varies the cadence applied to consumers. In experiment X 710, the management logic 124 applies Cadence A to electronic promotion correspondence sent to a first consumer sub-segment, Cadence B to a second consumer sub-segment, and so on. In experiment Y 711, the management logic 124 applies Cadence A' to a consumer sub-segment, Cadence B to another consumer sub-segment, and so on. In a similar fashion, the management logic 124 applies Cadence A, C, D', E, and F to respective consumer sub-segments assigned to experiment Z 712.

By employing experimental strategy 1 710, the management logic 124 may adjust both how consumers are segmented and/or sub-segmented as well as how each sub-segment is treated (e.g., according to varying cadences or other control factors). The management logic 124 may utilize one experiment in experimental strategy 1 710 to adjust how different cadences are applies to differently segment consumers in a first experiment while another experiment changes only the cadence for certain sub-segments. Additionally, experimental strategy 1 710 may provide direct insight to expected results upon ramping up an experiment to an entire consumer base.

Turning to experimental strategy 2 720, the management logic 124 may similarly segment consumers according to engagement level (y-axis) and randomly order consumers with the same engagement level (x-axis). The management logic 124 may segment consumers according to engagement level properties, applied different experiments to the segmented users as shown in FIG. 7, including those labeled as Expr A 721, Expr B 722, Expr C 723, etc. Employing experimental strategy 2 720 may allow the management logic 124 to determine how certain subsets of consumers react to different cadences. The management logic 124 may also infer global performance by selecting a composite of non-overlapping experiments. FIG. 7 thus illustrates two experimental strategies that the management logic 124 may employ, though any additional or alternative strategies are contemplated.

Figure 8:
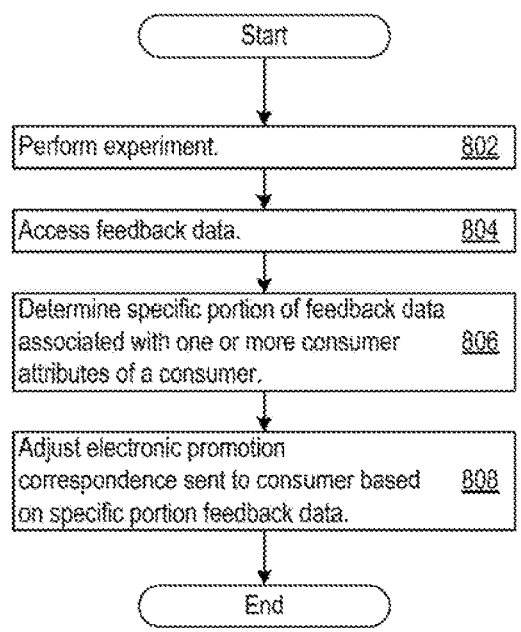
FIG. 8 shows an example of logic for collecting and using feedback data.

FIG. 8 shows an example of logic 800 for collecting and using feedback data. The logic 800 may be implemented in hardware, software, or a combination of both. As one example, the management logic 124 may implement the logic 800 in software as management instructions 132.

The management logic 124 may perform one or more experiments (802), such as by varying the cadence of electronic promotion correspondences sent to consumer segments or sub-segments of a consumer base. In performing the experiment, the management logic 124 may apply a specific strategy or experiment to consumer segments or sub-segments. The management logic 124 may obtain and/or access feedback data 610 generated by the experiment (804).

The management logic 124 may use the feedback data to predict how a particular consumer will respond to a particular correspondence by examining how similar consumers responded to similar correspondence. In that regard, the management logic 124 may determine a specific portion of the feedback 610 associated with one or more consumer attributes of a consumer (806). The management logic 124 may assign the particular consumer to a consumer bucket based on tuple of consumer attributes. In one particular implementation, the management logic 124 determines the tuple of consumer attributes to include engagement level data of the particular consumer and access a specific portion of the feedback data 610 collected from other consumers characterized by the same tuple of consumer attributes.

As one illustration, the particular consumer may be characterized by the following past engagement level data: {50/130 electronic promotion correspondences opened; 20/30 promotion class 1 correspondences opened; 20/30 promotion class 2 correspondences opened; 10/70 promotion class 3 correspondences opened; 1/14 correspondences opened in the past week}. In this illustration, the management logic 124 may characterize engagement level of the particular consumer as the following tuple of consumer attributes: {high overall volume; high class 1 affinity; high class 2 affinity; low class 3 affinity; low recent activity}. The management logic 124 may access the specific portion of the feedback data 610 originating from other consumers with the same tuple of consumer attributes.

The management logic 124 may selectively determine one or more tuple attributes to weight or ignore, for example when the number of consumers with the same tuple of consumer attributes is less than an accuracy threshold. Continuing the illustration above, the feedback data 610 accessed by the management logic 124 may include data from only 10 other consumers characterized by the tuple of {high overall volume; high class 1 affinity; high class 2 affinity; low class 3 affinity; low recent activity}. The management logic 124 may remove one or more of the tuple attributes from consideration (e.g., the high overall volume attribute), which may result in 200 consumers characterized by the tuple of {high class 1 affinity; high class 2 affinity; low class 3 affinity; low recent activity}. The management logic 124 may use this specific portion of the feedback data 610 instead.

Upon determining the specific portion of the feedback data 610, the management logic 124 may adjust electronic promotion correspondence sent to the consumer based on the specific portion of the feedback data 610 (808). The management logic 124 may adjust, for example, a target cadence of electronic promotion correspondence sent to the consumer.

The discussion above provides exemplary strategy level experimentation methods and techniques that the management logic 124 may conduct and utilize in managing electronic promotion correspondence sent to a consumer. Any number of additional or alternative strategy-level experimentations, methods, and techniques are contemplated. The management logic 124 may use strategy level experimentation to test experimental or new promotion correspondence formats or content.

One example of testing an experimental promotion correspondence format by the management logic 124 is provided with respect to a digest format for electronic promotion correspondence. The digest format may refer to a cross-class correspondence that includes promotions from multiple promotion classes (e.g., deal-of-the-day, getaways, goods, personal collections, etc.) within the same electronic promotion correspondence. The management logic 124 may perform an experiment on one or more consumer segments with the addition of the digest correspondence as a control factor. For example, the management logic 124 may perform the digest experiment as shown in Table 2 below (shown with respect to e-mail):

TABLE 2

Digest Experiment

| | Control | Experiment |
| --- | --- | --- |
| High-Engagement Level Consumers | Cadence A (Max 2 daily e-mails) | Cadence A + Digest E-mail |
| Medium-Engagement Level Consumers | Cadence B (One email per day) | Cadence B + Digest E-mail |
| Low-Engagement Level Consumers | Cadence C (One email per week) | Cadence C + Digest E-mail |

The management logic 124 may tune the experimental cadences A, B, and C based on obtained feedback data 610, e.g., periodically, after a predetermined amount of time, according to other tuning criteria that may be specified in the management parameters 134. The management logic 134 may perform a similar or consistent experimental process to test new correspondence formats or content, including correspondences of a new promotion class.

While some experimental processes have been described above, the management logic 124 may perform experiments according to any variance of control factor(s), different correspondence content or cadence, consumer base, consumer segmentation, and according to any experiment parameters.

The management logic 124 may also gather feedback data 610 in any number of additional or alternative ways. For example, the management logic 124 may implement any of the systems or logic and perform any of the methods and techniques described in U.S. patent application Ser. No. 13/756,145, titled "Pre-Feature Promotion System," Filed on Jan. 31, 2013, the entirety of which is hereby incorporated by reference herein. The management logic 124 may perform any of the methods or techniques described in the above-incorporated reference in addition to, in combination with, or as an alternative to any of methods for obtaining feedback or response data described herein.

Communication Channel Determination

As mentioned above, the management logic 124 may determine a communication channel through which to send an electronic correspondence. A communication channel may refer to any means through which the promotion program offering system 102 and/or management logic 124 may send an electronic promotion correspondence to consumer. A communication channel may vary for different types of communications through which the management logic 124 may send the electronic promotion correspondence, including as examples, e-mail, push notifications, SMS text messages, via social media mechanisms, through accessing of a website, or according to any other means to communicate or access electronic data.

Figure 9:
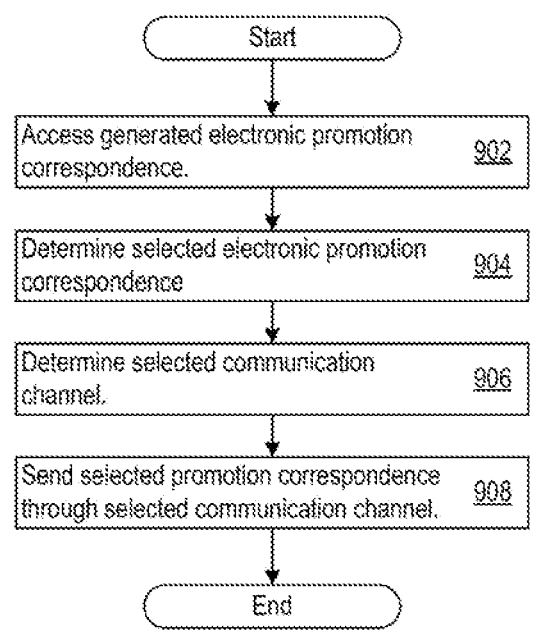
FIG. 9 shows an example of logic for selecting a communication channel for sending electronic promotion correspondence to a consumer.

FIG. 9 shows an example of logic 900 for selecting a communication channel for sending electronic promotion correspondence to a consumer. The logic 900 may be implemented in hardware, software, or a combination of both. As one example, the management logic 124 may implement the logic 900 in software as management instructions 132.

The management logic 124 may access a generated electronic promotion correspondence 220 (902) and determine a selected electronic promotion correspondence to send to the consumer (904). The management logic 124 may also determine a communication channel through which to send the selected electronic promotion correspondence (906).

The management logic 124 may determine a selected communication channel according to one or more communication channel selection criterion, which may be specified in the management parameters 134. For example, the management logic 124 may determine past engagement level associated with one or more available communication channels, and select the communication channel with the highest past engagement level. In other examples, the management logic 124 may perform a weighted analysis of the available communication channels, where the weights of each available communication channel may be based on any combination of operator-specified weights, target or actual cadence indicators for the available communication channels, past engagement level, consumer specified channel preferences, or any other factors.

In some variations, the management logic 124 may separately maintain a communication channel-specific cadence through which the management logic 124 determines whether to send electronic promotion correspondence through the communication channel. In that regard, the management logic 124 may make separate correspondence-sending determinations for one or more communication channel through which the management logic 124 can send electronic promotion correspondence. In this example, the generated electronic promotion correspondences 220 received by the management logic 124 may have been generated for communication across a particular communication channel. For example, the correspondence generation logic 212 described above may include particular logic for generating e-mail promotion correspondence, for generating mobile push notification promotion correspondence, etc., which the correspondence generation logic 212 may output as the generated electronic promotion correspondences 220.

In some variations, the management logic 124 may determine a selected communication channel based on a target transmission time for sending the electronic promotion correspondence. For example, the management logic 124 may select the communication channel with a most recent estimated access time by the consumer. Or, the management logic 124 may determine the target transmission time and select the communication channel that has a highest engagement level for the consumer at the target transmission time or within a time range that includes the target transmission time.

Upon determining the selected communication channel, the management logic 124 sends the selected electronic promotion correspondence through the selected communication channel (908).

The disclosure herein provides multiple methods and techniques to manage the sending of electronic promotion correspondence sent to consumers on a per-consumer basis. The management logic 124 may combine any of the above disclosed logic, methods and techniques as well as any of the systems, logic, methods, and techniques described in any of the references incorporated by reference herein. Accordingly, the management logic 124 may flexibly and efficiently manage electronic promotion correspondence sent to individual consumers in a configurable fine-grained manner.

The present disclosure contemplates a computer-readable medium that includes instructions or receives and executes instructions responsive to a propagated signal, to implement one or more of the systems and methods described herein. Further, the instructions can be transmitted or received over the network via a communication interface. The communication interface can be a part of the processor or can be a separate component. The communication interface can be created in software or can be a physical connection in hardware. The communication interface can be configured to connect with a network, external media, the display, or any other components in system, or combinations thereof. The connection with the network can be a physical connection, such as a wired Ethernet connection or can be established wirelessly as discussed below. In the case of a service provider server, the service provider server can communicate with consumers through the communication interface.

The computer-readable medium can be a single medium, or the computer-readable medium can be a single medium or multiple media, such as a centralized or distributed database, or associated caches and servers that store one or more sets of instructions. The term "computer-readable medium" can also include any medium that can be capable of storing, encoding or carrying a set of instructions for execution by a processor or that can cause a computer system to perform any one or more of the methods or operations disclosed herein.

The computer-readable medium can include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions can be stored.

Alternatively or in addition, dedicated hardware implementations, such as application specific integrated circuits, programmable logic arrays and other hardware devices, may be constructed to implement one or more of the systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and cannot be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

The invention claimed is:

1. A system comprising:
   a non-transitory memory storing processor-executable instructions; and
   a processor in communication with the non-transitory memory, the processor configured to execute the processor-executable instructions to:
   generate an experiment table data object comprising metadata defining correlations between a plurality of experimental cadences for transmitting electronic correspondences and a plurality of user profile segments, wherein each of the plurality of user profile segments is associated with an engagement attribute range with respect to past electronic correspondences;

based on the experiment table data object, select a first experimental cadence from the plurality of experimental cadences correlating to a first user profile segment;

transmit a first plurality of electronic correspondences to a first client device associated with the first user profile segment according to the first experimental cadence;

receive feedback data from the first client device associated with the first plurality of electronic correspondences;

determine a plurality of content items associated with a second plurality of electronic correspondences, wherein the plurality of content items are associated with a plurality of content item class indicators;

select a content item class indicator from the plurality of content item class indicators, wherein the processor is configured to:

calculate cadence differences between class-specific target cadence indicators and class-specific actual cadence indicators associated with the plurality of content item class indicators;

select a second electronic correspondence from the second plurality of electronic correspondences, wherein the second electronic correspondence comprises at least one content item associated with the content item class indicator; and in response to determining that the second electronic correspondence satisfies a class-specific cadence indicator criterion associated with the content item class indicator, transmit the second electronic correspondence to the first client device based on the feedback data.

2. The system of claim 1, wherein the processor is configured to:

access the second plurality of electronic correspondences generated for the first client device;

wherein each of the class-specific target cadence indicators is indicative of a target rate for sending electronic correspondence associated with one of the plurality of content item class indicators to the first client device, wherein each of the class-specific actual cadence indicators is indicative of an actual rate that previous electronic correspondences associated with one of the plurality of content item class indicators were sent to the first client device.

3. The system of claim 2, wherein, when determining the second electronic correspondence from the second plurality of electronic correspondences, the processor is further configured to:

determine a selected group of content items from the plurality of content items, wherein each content item in the selected group of content items is associated with the selected content item class indicator.

4. The system of claim 3, wherein the processor is further configured to:

determine a selected communication channel through which to send the second electronic correspondence to the first client device; and send the second electronic correspondence to the first client device through the selected communication channel.

5. The system of claim 4, wherein the processor is configured to determine the selected communication channel based on a target time for sending the second electronic correspondence.

6. The system of claim 4, wherein the processor is configured to:

determine the selected communication channel prior to selecting the second electronic correspondence; and select the second electronic correspondence from the second plurality of electronic correspondences based on the selected communication channel.

7. The system of claim 1, wherein the processor is further configured to:

determine a target time to send the second electronic correspondence to the first client device; and send the second electronic correspondence to the first client device at the target time.

8. A computer-implemented method, comprising:

generating an experiment table data object comprising metadata defining correlations between a plurality of experimental cadences for transmitting electronic correspondences and a plurality of user profile segments, wherein each of the plurality of user profile segments is associated with an engagement attribute range with respect to past electronic correspondences;

based on the experiment table data object, selecting a first experimental cadence from the plurality of experimental cadences correlating to a first user profile segment;

transmitting a first plurality of electronic correspondences to a first client device associated with the first user profile segment according to the first experimental cadence;

receiving feedback data from the first client device associated with the first plurality of electronic correspondences;

determining a plurality of content items associated with a second plurality of electronic correspondences, wherein the plurality of content items are associated with a plurality of content item class indicators;

selecting a content item class indicator from the plurality of content item class indicators, comprising:

calculating cadence differences between class-specific target cadence indicators and class-specific actual cadence indicators associated with the plurality of content item class indicators;

selecting a second electronic correspondence from the second plurality of electronic correspondences, wherein the second electronic correspondence comprises at least one content item associated with the content item class indicator; and in response to determining that the second electronic correspondence satisfies a class-specific cadence indicator criterion associated with the content item class indicator, transmitting the second electronic correspondence to the first client device based on the feedback data.

9. The computer-implemented method of claim 8, further comprising:

accessing the second plurality of electronic correspondences generated for the first client device;

wherein each of the class-specific target cadence indicators is indicative of a target rate for sending electronic correspondence associated with one of the plurality of content item class indicators to the first client device, wherein each of the class-specific actual cadence indicators is indicative of an actual rate that previous electronic correspondences associated with one of the plurality of content item class indicators were sent to the first client device.

10. The computer-implemented method of claim 9, wherein, when determining the second electronic correspondence from the second plurality of electronic correspondences, the computer-implemented method further comprises:
determining a selected group of content items from the plurality of content items, wherein each content item in the selected group of content items is associated with the selected content item class indicator.

11. The computer-implemented method of claim 10, wherein the computer-implemented method further comprises:
determining a selected communication channel through which to send the second electronic correspondence to the first client device; and
sending the second electronic correspondence to the first client device through the selected communication channel.

12. The computer-implemented method of claim 11, further comprising determining the selected communication channel based on a target time for sending the second electronic correspondence.

13. The computer-implemented method of claim 11, further comprising:
determining the selected communication channel prior to selecting the second electronic correspondence; and
selected the second electronic correspondence from the second plurality of electronic correspondences based on the selected communication channel.

14. The computer-implemented method of claim 8, further comprising:
determining a target time to send the second electronic correspondence to the first client device; and
sending the second electronic correspondence to the first client device at the target time.

15. A computer program product comprising at least one non-transitory computer-readable storage medium having computer-readable program code portions stored therein, the computer-readable program code portions comprising an executable portion configured to:
generate an experiment table data object comprising metadata defining correlations between a plurality of experimental cadences for transmitting electronic correspondences and a plurality of user profile segments, wherein each of the plurality of user profile segments is associated with an engagement attribute range with respect to past electronic correspondences;
based on the experiment table data object, select a first experimental cadence from the plurality of experimental cadences correlating to a first user profile segment;
transmit a first plurality of electronic correspondences to a first client device associated with the first user profile segment according to the first experimental cadence;
receive feedback data from the first client device associated with the first plurality of electronic correspondences;
determine a plurality of content items associated with a second plurality of electronic correspondences, wherein the plurality of content items are associated with a plurality of content item class indicators;
select a content item class indicator from the plurality of content item class indicators, wherein the computer-readable program code portions comprise the executable portion configured to:
calculate cadence differences between class-specific target cadence indicators and class-specific actual cadence indicators associated with the plurality of content item class indicators;
select a second electronic correspondence from the second plurality of electronic correspondences, wherein the second electronic correspondence comprises at least one content item associated with the content item class indicator; and
in response to determining that the second electronic correspondence satisfies a class-specific cadence indicator criterion associated with the content item class indicator, transmit the second electronic correspondence to the first client device based on the feedback data.

16. The computer program product of claim 15, wherein the computer-readable program code portions comprise the executable portion configured to:
access the second plurality of electronic correspondences generated for the first client device;
wherein each of the class-specific target cadence indicators is indicative of a target rate for sending electronic correspondence associated with one of the plurality of content item class indicators to the first client device, wherein each of the class-specific actual cadence indicators is indicative of an actual rate that previous electronic correspondences associated with one of the plurality of content item class indicators were sent to the first client device.

17. The computer program product of claim 16, wherein the computer-readable program code portions comprise the executable portion configured to:
determine a selected group of content items from the plurality of content items, wherein each content item in the selected group of content items is associated with the selected content item class indicator.

18. The computer program product of claim 17, wherein the computer-readable program code portions comprise the executable portion configured to:
determine a selected communication channel through which to send the second electronic correspondence to the first client device; and
send the second electronic correspondence to the first client device through the selected communication channel.

19. The computer program product of claim 18, wherein the computer-readable program code portions comprise the executable portion configured to determine the selected communication channel based on a target time for sending the second electronic correspondence.

20. The computer program product of claim 18, wherein the computer-readable program code portions comprise the executable portion configured to:
determine the selected communication channel prior to selecting the second electronic correspondence; and
select the second electronic correspondence from the second plurality of electronic correspondences based on the selected communication channel.

* * * * *